United States Patent [19]

Rempel et al.

[11] Patent Number: 4,464,515
[45] Date of Patent: Aug. 7, 1984

[54] POLYMER HYDROGENATION PROCESS

[75] Inventors: Gary L. Rempel; Hormoz Azizian, both of Waterloo, Canada

[73] Assignee: Polysar Limited, Canada

[21] Appl. No.: 540,408

[22] Filed: Oct. 11, 1983

[30] Foreign Application Priority Data

Dec. 8, 1982 [CA] Canada .................................. 417259

[51] Int. Cl.$^3$ .............................................. C08F 8/04
[52] U.S. Cl. .................................... 525/338; 525/339
[58] Field of Search ................................ 525/338, 339

[56] References Cited

U.S. PATENT DOCUMENTS 2,585,583  2/1952  Pinkney ................................ 525/338
3,366,646  1/1968  Dewhirst ............................. 525/338
3,898,208  8/1975  Krause ................................. 525/338

FOREIGN PATENT DOCUMENTS 2070023A  2/1981  United Kingdom ................ 525/338

Primary Examiner—Paul R. Michl
Assistant Examiner—Alex H. Walker
Attorney, Agent, or Firm—Stevens, Davis, Miller & Mosher

[57] ABSTRACT

A process is provided for the selective hydrogenation of the carbon-carbon double bonds in a copolymer of a conjugated diene and one or more copolymerizable monomers comprising hydrogenating the copolymer in the presence of (i) a monovalent rhodium hydride complex catalyst, (ii) a ligand compound, and (iii) a solvent for the copolymer, catalyst and ligand compound.

20 Claims, No Drawings

POLYMER HYDROGENATION PROCESS

This invention relates to a process for the selective hydrogenation of the carbon-carbon double bonds in a copolymer of a conjugated diene and one or more copolymerizable monomers.

A variety of processes are known for the hydrogenation of carbon-carbon double bonds in polymers including processes using either homogeneous or heterogeneous catalysts. French Pat. No. 2,421,923 teaches the partial hydrogenation of the double bonds in acrylonitrile-butadiene rubber (NBR) over a palladium/charcoal catalyst. German Offenlegungsschrift No. 3,046,008 teaches the selective hydrogenation of the double bonds in conjugated diene containing polymers such as NBR, wherein the catalyst is palladium and at least one other element on a support which may be silica, alumina or activated carbon. German Offenlegungsschrift No. 3,046,251 teaches a similar process except that the catalyst support is channel or furnace carbon black.

British Patent Application No. 2,070,023A teaches a process for the selective hydrogenation of the double bonds in unsaturated organic polymers such as acrylonitrile-butadiene-styrene polymers, when in the form of an aqueous emulsion, using a catalyst such as chlorotris(triphenylphosphine) rhodium in a hydrocarbon solution.

U.S. Pat. No. 3,898,208 teaches the hydrogenation of latexes of oil-insoluble polymers of conjugated dienes. The latex is dispersed in a swelling agent for the polymer and hydrogenated in the presence of a catalyst complex which may be a rhodium complex catalyst such as chlorotris(triphenylphosphine) rhodium. The swelling agent must also be a solvent for the catalyst complex.

U.S. Pat. No. 3,700,637 teaches that the double bonds in alternating copolymers of conjugated dienes and unsaturated nitriles may be hydrogenated using catalysts exemplified by chlorotris(triphenylphosphine) rhodium.

British Pat. No. 1,558,491 teaches the hydrogenation of the double bonds in copolymers of a conjugated diene and an α,β-unsaturated carboxylic acid or derivative thereof, for example acrylonitrile, using a homogeneous monovalent or trivalent rhodium halide complex as catalyst, preferably at a temperature of 75°–115° C. and at a pressure of 5–10 MPa. The amount of hydrogenation is highly solvent dependent.

U.S. Pat. No. 3,480,659 teaches a process for the selective hydrogenation of double bonds in unsaturated monomers containing 2 to 20 carbon atoms using a homogeneous rhodium hydride complex catalyst, for example hydridotetrakis(triphenylphosphine) rhodium.

Italian Pat. No. 912,648 teaches that cycloalkadienes and alkadienes may be selectively hydrogenated to the corresponding cycloalkenes and alkenes using a catalyst such as hydridotetrakis(triphenylphosphine) rhodium.

It is desirable to have a process for the selective hydrogenation of the carbon-carbon double bonds in copolymers wherein improved rates of hydrogenation can be achieved under relatively mild reaction conditions and wherein the amount of hydrogenation is relatively insensitive to the type of solvent used.

It is an object of the present invention to provide an improved process for the selective hydrogenation of the carbon-carbon double bonds in a copolymer of a conjugated diene and one or more copolymerizable monomers.

It is a further object of the present invention to provide a process for the selective hydrogenation of the carbon-carbon double bonds in a copolymer of a conjugated diene and one or more copolymerizable monomers wherein the copolymer may be hydrogenated either in the form of a homogeneous solution or an aqueous emulsion and wherein the catalyst may be dissolved in the reaction medium.

Accordingly, the present invention provides an improved process for the selective hydrogenation of the carbon-carbon double bonds in a copolymer of a conjugated diene and one or more copolymerizable monomers which comprises hydrogenating said copolymer at a temperature of from about 40° to about 170° C. and at a pressure of hydrogen of from about 0.05 to about 7 MPa, the improvement being that said hydrogenation is carried out in the presence of (i) from about 0.05 to about 20 percent by weight of a catalyst which is a monovalent rhodium hydride complex of the general formula $RhH(L_1)_x$ in which x is 3 or 4 and $L_1$ is a first ligand compound, (ii) from about 1 to about 25 percent by weight of a second ligand compound $L_2$ and (iii) a solvent for said copolymer, said (i) and said (ii), the weights of said (i) and (ii) being based on the weight of said copolymer and the weight ratio of (ii):(i) being from about 0.6:1 to about 20:1, wherein $L_1$ and $L_2$ may be the same or different ligand compounds which when x is 4, are phosphorus compounds selected from 5-phenyl-5H-dibenzophosphole and compounds of the formula $PR_1R_2R_3$ and when x is 3, are arsenic or antimony compounds of the formula $MR_1R_2R_3$ wherein M is arsenic or antimony, and wherein $R_1$, $R_2$ and $R_3$ may be the same or different and are selected from $CH_3$, $C_2H_5$, $C_{6-10}$ aryl groups and $C_{7-12}$ aralkyl groups.

The copolymers containing carbon-carbon double bonds which may be hydrogenated by the process of the present invention are copolymers of a conjugated diene with one or more copolymerizable monomers. The copolymers may be of random, alternating or block structure. Suitable conjugated dienes include $C_{4-6}$ conjugated dienes such as butadiene, isoprene, dimethylbutadiene and piperylene. Suitable copolymerizable monomers include acrylonitrile and methacrylonitrile, alkenylaromatic hydrocarbons such as styrene and α-methylstyrene, and $C_{3-6}$ α,β-unsaturated mono- or polycarboxylic acids such as itaconic, fumaric, maleic, acrylic and methacrylic acids. Preferred copolymers include butadiene-(meth)acrylonitrile copolymers, copolymers of butadiene with (meth)acrylonitrile and one or more of the $C_{3-6}$ α,β-unsaturated carboxylic acids, isoprene-(meth)acrylonitrile copolymers, and AB, ABA and ABCBA block copolymers wherein A may be one of butadiene or isoprene, B may be one of styrene or α-methylstyrene, and C may be a coupling agent residue.

The solvent used in the process of the present invention may be any organic solvent in which the copolymer, catalyst and second ligand compound $L_2$ are soluble and which is not adversely affected by the hydrogenation conditions. Suitable such solvents include the aryl hydrocarbons and their alkyl and halo derivatives such as benzene, toluene, xylene, and chlorobenzene, halogenated aliphatic hydrocarbons such as methylene chloride, 1,1,2-trichloroethane and dichloroethane, aliphatic ethers such as tetrahydrofuran, certain ketones such as acetone, and mixtures thereof. Acetone is reduced to some extent to form isopropanol under the reaction conditions but this does not interfere with the desired hydrogenation of the copolymer. Other ketones may be reduced to a greater extent with the possibility of precipitating the copolymer from solution and thereby limiting the amount of hydrogenated copolymer produced. Such ketones should therefore be used with caution.

A first preferred embodiment of the process of the present invention is a homogeneous solution hydrogenation process wherein the hydrogenation is carried out with the copolymer, catalyst and second ligand compound $L_2$ dissolved in the solvent. The copolymer may first be dissolved in the solvent and the resulting solution degassed. The catalyst and the second ligand compound may then be added to and dissolved in the solution contained in a reaction vessel and the reaction vessel pressured with hydrogen gas. Alternatively, the copolymer solution contained in a reaction vessel may be pressured with hydrogen followed by the addition of catalyst and second ligand compound to the reaction vessel. Then the reaction vessel is heated rapidly to the desired temperature, agitation is initiated and the hydrogenation reaction allowed to proceed for the desired length of time, the pressure of hydrogen preferably but not necessarily being held constant. Upon completion of the reaction, the hydrogenated copolymer may be recovered by any convenient method well known in the art. For example, the reaction mixture may be mixed with an alcohol or contacted with hot water and/or steam in order to precipitate the copolymer which is then separated, washed if desired, and dried e.g. under vacuum in a hot air oven. If desired, the catalyst may be recovered by the method described in U.S. Pat. No. 3,545,963.

The concentration of copolymer in the solution is from about 1 to about 20 percent by weight and preferably from about 1 to about 10 percent by weight, based on the total weight of the solution.

Catalyst is used in an amount from about 0.05 to about 20 percent by weight based on the weight of the copolymer and preferably from about 0.1 to about 15 percent by weight. Suitable catalysts include hydridotetrakis(trimethyl-, triethyl- and triphenyl-phosphine) rhodium, and hydridotris(triphenylarsine) rhodium.

A second ligand compound $L_2$ is added to the reaction mixture. It is generally considered that the added ligand compound acts to stabilize the catalyst. While the second ligand compound $L_2$ may be different from the first ligand compound $L_1$ present in the catalyst, it is preferred that $L_1$ and $L_2$ be the same. Suitable ligand compounds include trimethyl-, triethyl- and triphenyl-phosphine and triphenylarsine. It is preferred that both $L_1$ and $L_2$ are triphenylphosphine and that the catalyst therefore is hydridotetrakis(triphenylphosphine) rhodium. The amount of the second ligand compound which is added is from about 1 to about 25 percent by weight based on the weight of the copolymer and preferably from about 3 to about 20 percent by weight. The weight ratio of second ligand compound to catalyst is from about 0.6:1 to about 20:1, and preferably from about 0.6:1 to about 10:1.

The reaction vessel is pressured with gaseous hydrogen to a pressure of hydrogen of from about 0.05 to about 7 MPa and preferably from about 0.05 to about 3 MPa. It is preferred that pure hydrogen gas be used. However, hydrogen gas containing very small amounts of inert gases such as nitrogen may also be used.

The hydrogenation reaction is carried out at a temperature of from about 40° to about 170° C. and preferably from about 80° to about 160° C. Under these conditions, essentially complete hydrogenation of the carbon-carbon double bonds may be achieved in from about 1 to about 50 hours. Preferred reaction times may be from about 2 to about 10 hours. By using suitable conditions of time and temperature it is possible to obtain copolymers which are only partially hydrogenated. The amount of hydrogenation may be adjusted to suit the requirements for the product required.

In a second preferred embodiment of the process of the present invention, the copolymer is hydrogenated in the form of an aqueous emulsion. Copolymers of conjugated dienes and copolymerizable monomers are frequently manufactured by a free radical emulsion process. The copolymer emulsion so formed may be hydrogenated using the process of the present invention. Copolymers made by other methods may be emulsified by any of the processes well known to the art.

The copolymer emulsion is placed in a reaction vessel and diluted with water if necessary to provide an emulsion containing from about 3 to about 40 and preferably from about 5 to about 10 percent by dry weight of copolymer based on the total weight of the emulsion. Sufficient solvent is added to the reaction vessel so that the dry weight of copolymer is from about 1 to about 20 and preferably from about 3 to about 10 percent based on the total weight of the solvent and copolymer. In this embodiment, mixtures of solvents are preferred, such as toluene or chlorobenzene with acetone, especially 1:1 mixtures by volume.

The contents of the reaction vessel are degassed and the reaction vessel is purged and then the catalyst and the second ligand compound are added. The reaction vessel is pressured with hydrogen, heated rapidly to reaction temperature, and stirring commenced. The product is recovered following completion of the hydrogenation as described above. The preferred hydrogen pressure is from about 1.4 to about 4 MPa and the preferred reaction temperature is from about 20° to about 120° C. In this embodiment, the preferred amount of catalyst is from about 1 to about 2 percent by weight based on the copolymer and the preferred catalyst is hydridotetrakis(triphenylphosphine) rhodium. The preferred amount of the second ligand compound is from about 10 to about 20 percent by weight based on the copolymer and the preferred ligand compound is triphenylphosphine. The preferred weight ratio of the ligand compound to the catalyst is from about 5:1 to about 15:1. Suitable reaction times may be from about 10 to about 40 hours. Under the preferred conditions of temperature and pressure, essentially complete hydrogenation of the carbon-carbon double bonds may be achieved in from about 12 to about 25 hours. Partially hydrogenated copolymers may be obtained by using suitable conditions of time and temperature.

The hydrogenated products of the process of the present invention are vulcanizable elastomers the vulcanizates of which may be used in applications requiring resistance to oxidizing conditions at elevated temperatures for extended periods of time as for example in the various hoses and seals in the engine compartment of an automobile. These hydrogenated copolymers may be vulcanized using conventional peroxide or peroxide/sulfur curing system. It is preferred to use vulcanizates in which from about 50 to about 99.95 percent, more preferably from about 95 to about 99.95 percent, and most preferably from about 99 to about 99.95 percent of the carbon-carbon double bonds in the copolymer have been hydrogenated.

The following examples illustrate the present invention and are not intended to be limiting.

EXAMPLE 1

In this and succeeding examples, the copolymers which were hydrogenated are listed in Table 1. The composition figures are given in percent by weight.

TABLE 1

| Copolymer | Composition |
|---|---|
| I | An acrylonitrile-butadiene copolymer containing 66 per cent butadiene sold under the trade name KRYNAC 34.50 by Polysar Limited. |
| II | An acrylonitrile-butadiene copolymer containing 60 per cent butadiene sold under the trade name KRYNAC 40.65 by Polysar Limited. |
| III | An acrylonitrile-isoprene copolymer containing 66 per cent isoprene sold under the trade name KRYNAC 833 by Polysar Limited. |
| IV | A carboxylated acrylonitrile-butadiene copolymer containing 64 percent butadiene sold under the trade name KRYNAC 221 by Polysar Limited. |
| V | A carboxylated acrylonitrile-butadiene copolymer containing 66 percent butadiene sold under the trade name KRYNAC 110C by Polysar Limited. |
| VI | A styrene-butadiene-styrene block copolymer containing 79 percent butadiene sold under the trade name KRATON 1102 by Shell Chemical Company. |

This example illustrates a homogeneous solution hydrogenation process of the present invention. Each of the six copolymers listed in Table 1 was hydrogenated separately using hydridotetrakis(triphenylphosphine) rhodium as catalyst, triphenylphosphine as ligand compound and chlorobenzene as solvent.

The copolymer was dissolved in the solvent under an inert atmosphere of nitrogen or argon and the solution so formed was then transferred to a 1.5 l glass lined autoclave, the autoclave assembled and the solution degassed by bubbling the inert gas through the solution for 10 minutes. The autoclave was purged repeatedly by pressuring with inert gas for periods of 5 minutes and then releasing the pressure. The autoclave was opened briefly, the catalyst and ligand compound added, and the autoclave closed and pressured with hydrogen to 2.8 MPa for a period of 5 minutes. The pressure was released and then the autoclave was repressured with hydrogen to the desired reaction pressure and heated rapidly over a period of 15-20 minutes to the reaction temperature. Stirring was initiated and the reaction allowed to proceed for the desired length of time. Hydrogen gas was added as required to maintain the pressure essentially constant throughout the reaction period.

After the desired reaction period, the autoclave was cooled rapidly in an ice-salt bath, depressured and opened. A volume of isopropanol equal to about 2-4 times the volume of the solvent used in the reaction was added to the reaction product. The hydrogenated product which precipitated out of solution was separated by filtration, washed with isopropanol and dried under vacuum at 50° C.

The product was analyzed by proton NMR to determine the amount of hydrogenation of the carbon-carbon double bonds. Analysis by carbon-13 NMR showed that no hydrogenation occurred of the nitrile groups of Copolymers I through V of Table 1. Analysis by IR spectroscopy showed that no hydrogenation occurred of the acid groups of Copolymers IV and V.

The amounts of catalyst, second ligand compound, solvent and copolymer used are shown in Table 2. In this example and in those that follow, the concentration of copolymer in the solution is in percent by weight based on the total weight of the solution while the concentration of the catalyst and ligand compound are in percent by weight based on the copolymer. The percent hydrogenation figures given are the percent of the carbon-carbon double bonds of the copolymer which have been hydrogenated. When a value of 99+ is given, the amount of hydrogenation is greater than 99 percent and less than or equal to 99.95 percent, i.e. essentially complete hydrogenation.

TABLE 2

| Run No. | Copolymer Type | Conc. | Concentration Catalyst | Ligand | Hydrogen Pressure (MPa) | Reaction Temp. (°C.) | Solvent Volume (ml) | Reaction Time (hr) | Percent Hydrogenation |
|---|---|---|---|---|---|---|---|---|---|
| 1 | I | 6.0 | 1.0 | 10 | 2.8 | 110 | 700 | 4.0 | 99+ |
| 2 | I | 2.5 | 1.0 | 10 | 1.4 | 110 | 350 | 4.5 | 99+ |
| 3 | I | 2.5 | 1.0 | 10 | 2.8 | 97 | 350 | 4.0 | 97 |
| 4 | I | 2.5 | 1.0 | 10 | 2.8 | 160 | 350 | 1.0 | 99+ |
| 5 | I | 2.5 | 0.5 | 5 | 2.8 | 110 | 350 | 2.0 | 99+ |
| 6 | II | 6.0 | 1.0 | 10 | 2.8 | 87 | 700 | 4.0 | 91 |
| 7 | II | 6.0 | 1.0 | 10 | 2.8 | 90 | 700 | 3.6 | 85 |
| 8 | II | 6.0 | 1.0 | 10 | 2.8 | 110 | 700 | 3.5 | 99+ |
| 9 | III | 2.5 | 1.0 | 10 | 2.8 | 110 | 350 | 4.5 | 51 |
| 10 | III | 2.5 | 1.0 | 10 | 2.8 | 130 | 350 | 15.0 | 90 |
| 11 | IV | 6.0 | 0.5 | 5 | 2.8 | 110 | 700 | 7.0 | 94 |
| 12 | IV | 2.5 | 1.0 | 10 | 2.8 | 110 | 350 | 6.5 | 99+ |
| 13 | V | 6.0 | 0.5 | 5 | 2.8 | 110 | 700 | 3.0 | 99+ |
| 14 | VI | 6.0 | 0.5 | 5 | 2.8 | 110 | 700 | 3.0 | 99+ |

EXAMPLE 2

This example illustrates the hydrogenation of a copolymer in the form of an aqueous emulsion and in the presence of a hydrocarbon solvent mixture. To a 1.5 l glass lined autoclave were added in a first run 50 ml of an aqueous latex of Copolymer I from Table 1 which contained about 10 g of copolymer, 75 ml of water and 75 ml of toluene. Stirring was initiated and 75 ml of acetone were then slowly added and the system was degassed and purged as described in Example 1. 0.2 g of hydridotetrakis(triphenylphosphine) rhodium and 2.0 g of triphenylphosphine were added to the autoclave followed by pressuring with hydrogen gas to 2.8 MPa. The autoclave was heated rapidly to 110° C. Samples were withdrawn after 5 and 7 hours reaction time. Proton NMR indicated that 58 percent (5 hours) and 71 percent (7 hours) of the carbon-carbon double bonds in the copolymer had been hydrogenated.

In a second run, the same procedure was followed except that 250 ml of toluene, 125 ml of acetone, 0.1 g of hydridotetrakis(triphenylphosphine) rhodium and 1.0 g of triphenylphosphine were used. A sample was withdrawn after 8 hours and analyzed by proton NMR which showed that 51 percent of the carbon-carbon double bonds had been hydrogenated.

In a third run the same procedure was used except that 150 ml of water were added along with 150 ml of chlorobenzene in place of the toluene followed by 150 ml of acetone. A sample was withdrawn after 16 hours and analyzed by proton NMR which showed that 98 percent of the carbon-carbon double bonds had been hydrogenated.

In a fourth run the procedure of the third run was followed using twice as much of each component in the hydrogenation reaction. A sample was withdrawn after 20 hours and proton NMR analysis showed that 99+ percent of the carbon-carbon double bonds had been hydrogenated.

EXAMPLE 3

This example illustrates the use of a homogeneous solution hydrogenation process of the present invention to produce hydrogenated copolymers with varying degrees of hydrogenation of the carbon-carbon double bonds. Two runs were made in which the reaction temperature was increased slowly to a maximum and then maintained at this temperature. Samples were withdrawn while the temperature was increasing and after the maximum was reached and were analyzed by proton NMR for the percent of carbon-carbon double bonds which had been hydrogenated.

In a first run, 10.0 g of Copolymer I of Table 1 were dissolved in 350 ml of chlorobenzene and the solution added to the autoclave as in Example 1 followed by degassing and purging with nitrogen. 0.1 g of the catalyst hydridotetrakis(triphenylphosphine) rhodium and 1.0 g of triphenylphosphine were added and the autoclave pressured to 2.8 MPa with hydrogen. The autoclave was heated from room temperature to 97° C. over a period of 3.5 hr and maintained at 97° C. for a further 0.7 hr after which the reaction was terminated and the product recovered as described in Example 1. Analytical results are shown in Table 3.

TABLE 3

| Reaction Time (hr) | Reaction Temperature (°C.) | Percent Hydrogenation |
|---|---|---|
| 1.5 | 60 | 35 |
| 2.0 | 70 | 41 |
| 2.5 | 83 | 55 |
| 3.0 | 90 | 79 |
| 3.3 | 92 | 85 |
| 3.5 | 97 | 94 |
| 4.2 | 97 | 99+ |

In a second run, 700 ml of a 6.0 percent by weight solution in chlorobenzene of Copolymer II from Table 1 were hydrogenated as in the first run in the presence of 0.50 g of the same catalyst and 5.0 g of triphenylphosphine. The autoclave was pressured to 2.8 MPa of hydrogen and heated to 87° C. over a period of 3.0 hr and then maintained at this temperature for an additional 1.2 hr. Analytical results are given in Table 4.

TABLE 4

| Reaction Time | Reaction Temperature (°C.) | Percent Hydrogenation |
|---|---|---|
| 1.5 | 67 | 22 |
| 2.0 | 76 | 36 |
| 2.3 | 80 | 41 |
| 3.0 | 87 | 60 |
| 3.3 | 87 | 76 |
| 4.2 | 87 | 91 |

These runs both demonstrate that by stopping the reaction at any desired point and recovering the product, one may obtain a partially hydrogenated product.

EXAMPLE 4

This example illustrates a homogeneous solution hydrogenation process of the present invention using a range of solvents. The procedure used was that described in Example 1 except that only Copolymer I from Table 1 was hydrogenated in each of the runs. In each run, the hydrogen pressure was 2.8 MPa and the reaction temperature was 110° C. Data are given in Table 5.

TABLE 5

| Run No. | Copolymer Conc. | Concentration Catalyst | Ligand | Solvent Type | Volume (ml) | Reaction Time (hr) | Percent Hydrogenation |
|---|---|---|---|---|---|---|---|
| 1 | 2.5 | 0.5 | 5 | chlorobenzene | 350 | 2.0 | 99+ |
| 2 | 2.5 | 1.0 | 10 | p-xylene | 450 | 2.5 | 75 |
| 3 | 2.5 | 0.7 | 7 | acetone | 500 | 4.0 | 99+ |
| 4 | 2.5 | 1.0 | 10 | benzene | 350 | 8.5 | 98 |
| 5 | 2.3 | 2.0 | 20 | toluene | 500 | 8.0 | 93 |
| 6 | 2.5 | 2.0 | 20 | 1,1,2-trichloroethane | 272 | 7.0 | 99+ |

EXAMPLE 5

This example illustrates a homogeneous solution hydrogenation process of the present invention using a range of catalyst and second ligand compound concentrations and a range of hydrogen pressures. The procedure used was that of Example 1 except that only Copolymers I and IV from Table 1 were hydrogenated. In each run the reaction temperature was 110° C. and the solvent was chlorobenzene. Data are given in Table 6.

TABLE 6

| Run No. | Copolymer Type | Conc. | Concentration Catalyst | Ligand | Hydrogen Pressure (MPa) | Solvent Volume (ml) | Reaction Time (hr) | Percent Hydrogenation |
|---|---|---|---|---|---|---|---|---|
| 1 | I | 2.5 | 1.0 | 10 | 1.4 | 350 | 4.5 | 99+ |
| 2 | I | 2.5 | 1.0 | 5 | 2.8 | 350 | 2.5 | 99+ |
| 3 | I | 2.5 | 0.5 | 5 | 2.8 | 350 | 2.0 | 99+ |
| 4 | I | 2.5 | 0.1 | 1 | 2.8 | 350 | 6.0 | 88 |
| 5 | I | 2.5 | 1.0 | 10 | 0.5 | 350 | 3.0 | 99+ |
| 6 | IV | 6.0 | 0.5 | 5 | 2.8 | 700 | 7.0 | 94 |
| 7 | IV | 2.5 | 1.0 | 10 | 2.8 | 350 | 6.5 | 99+ |
| 8 | IV | 5.7 | 1.5 | 15 | 2.8 | 800 | 6.0 | 99+ |

EXAMPLE 6

This example illustrates a homogeneous solution hydrogenation process of the present invention. Copolymer 1 of Table 1 was hydrogenated in separate runs using two different catalyst-ligand compound combinations. In a first run, the catalyst was hydridotetrakis(triphenylphosphine) rhodium and the ligand compound was triphenylphosphine. In a second run, the catalyst was hydridotris(triphenylarsine) rhodium and the ligand compound was triphenylarsine.

Both runs were carried out using a constant pressure gas uptake apparatus which was very similar to that described by J. L. Bolland in "The Proceedings of the Royal Society", Volume A186, p. 218-236, 1946. The procedure used was that 0.18 g of Copolymer I from Table 1 was dissolved under a nitrogen atmosphere in 10 ml of chlorobenzene contained in a 50 ml two-necked glass flask. The side arm of the flask was equipped with a quick fit extended cone with an attached hook from which could be suspended a glass bucket. The amounts of catalyst and second ligand compound shown in Table 7 were placed in the bucket which was then suspended from the hook. The cone with suspended bucket was inserted into the side arm of the flask. The solution in the flask was degassed under vacuum by repeated freezing with liquid nitrogen and thawing. Hydrogen gas was then admitted to the flask to provide a pressure of about 0.06 MPa. The flask was immersed in a silicone oil bath, maintained at 80°±0.1° C. and a piston rod driven by a variable speed electric motor was attached to the flask so that operation of the motor could provide a rapid shaking motion to the flask and its contents. The hydrogen pressure was adjusted to the reaction pressure shown in Table 7, operation of the motor initiated and the flask and its contents shaken for about 0.5 hour to ensure equilibrium of the hydrogen dissolved in the copolymer solution and that in the gaseous phase. The cone was turned so that the bucket and its contents fell into the solution. Shaking was resumed and as the reaction proceeded, hydrogen gas was introduced into the system to maintain the initial pressure. The hydrogen consumption was monitored by the rise in the mercury level in the precision bore tubing of the apparatus. After the reaction time shown in Table 7, the reaction mixture was cooled at room temperature and the flask disconnected from the apparatus. 20 ml of isopropanol were added to the reaction mixture, and the hydrogenated copolymer product which precipitated out was separated by filtration, washed with isopropanol and dried under vacuum at 50° C. This material was analyzed by proton NMR to determine the amount of hydrogenation of the carbon-carbon double bonds. Analysis by carbon 13 NMR showed that no hydrogenation of the nitrile groups in the copolymer had occurred.

TABLE 7

| Run | Concentration Catalyst | Ligand | Hydrogen Pressure (MPa) | Reaction Time (hours) | Percent Hydrogenation |
|---|---|---|---|---|---|
| 1 | 14 | 9.5 | 0.068 | 3.8 | 99+ |
| 2 | 13 | 11 | 0.068 | 24 | 50 |

EXAMPLE 7

This example illustrates that a hydrogenated copolymer of butadiene and acrylonitrile may be cured using a peroxide/sulfur vulcanization system to produce vulcanizates having useful elastomeric properties even after air aging for up to 1,000 hours at 150° C. A 10 g sample of a hydrogenated copolymer, prepared by hydrogenating copolymer I of Table 1 to produce a copolymer in which 99.1 percent of the carbon-carbon double bonds were hydrogenated, was placed on a two-roll micro mill and compounded in the conventional manner by the addition of the compounding ingredients shown in Table 8. The sample was oven cured at 180° C. for 5.5 minutes to produce the optimum state of cure as measured using a Monsanto Oscillating Disc Rheometer. The tensile properties shown in Table 9 were then measured according to ASTM-D412-80. Hardness properties were measured using a Type A Shore durometer according to ASTM-D2240-81. Hot air aging was carried out according to ASTM-D865-81 at 150° C.

TABLE 8

| Compounding Ingredient | Amount (parts by weight per 100 parts by weight of copolymer) |
|---|---|
| p-Cumyldiphenyl amine | 2.0 |
| 2-Mercaptobenzimidazole | 2.0 |
| Sulfur | 0.1 |
| Zinc oxide | 5.0 |
| Precipitated amorphous anhydrous silica | 50 |
| Ether thioether plasticizer | 10 |
| Processing aid (sold under trade name TE 80 by Technical Processing Inc.) | 1.0 |
| N,N'—m-phenylenedimaleimide | 1.0 |
| 2,5-Dimethyl-2,5-di-t-butyl-peroxyhexane | 3.5 |

TABLE 9

| Physical Property | Air Aged for (Hours) | | | | |
|---|---|---|---|---|---|
| | 0 | 74 | 168 | 504 | 1,000 |
| Hardness | 70 | 72 | 78 | 80 | * |
| Tensile stress (MPa) at 100% elongation | 1.0 | 2.5 | 3.4 | 5.4 | 8.6 |

TABLE 9-continued

| Physical Property | Air Aged for (Hours) | | | | |
|---|---|---|---|---|---|
| | 0 | 74 | 168 | 504 | 1,000 |
| at 300% elongation | 2.9 | 5.9 | 8.3 | 13.2 | 14.7 |
| at rupture | 14.2 | 23.0 | 21.6 | 20.1 | 16.4 |
| Elongation, % at rupture | 860 | 750 | 700 | 600 | 380 |

*not measured

What is claimed is:

1. An improved process for the selective hydrogenation of the carbon-carbon double bonds in a copolymer of a conjugated diene and one or more copolymerizable monomers which comprises hydrogenating said copolymer at a temperature of from about 40° to about 170° C. and at a pressure of hydrogen of from about 0.05 to about 7 MPa, the improvement being that said hydrogenation is carried out in the presence of (i) from about 0.05 to about 20 percent by weight of a catalyst which is a monovalent rhodium hydride complex of the general formula $RhH(L_1)_x$ in which x is 3 or 4 and $L_1$ is a first ligand compound, (ii) from about 1 to about 25 percent by weight of a second ligand compound $L_2$ and (iii) a solvent for said copolymer, said (i) and said (ii), the weights of said (i) and (ii) being based on the weight of said copolymer and the weight ratio of (ii):(i) being from about 0.1:1 to about 20:1, wherein $L_1$ and $L_2$ may be the same or different ligand compounds which when x is 4, are phosphorus compounds selected from 5-phenyl-5H-dibenzophosphole and compounds of the formula $PR_1R_2R_3$ and when x is 3, are arsenic or antimony compounds of the formula $MR_1R_2R_3$ wherein M is arsenic or antimony, and wherein $R_1$, $R_2$ and $R_3$ may be the same or different and are selected from $CH_3$, $C_2H_5$, $C_{6-10}$ aryl groups and $C_{7-12}$ aralkyl groups.

2. The process according to claim 1 which is a homogeneous solution hydrogenation process wherein said hydrogenation is carried out with said copolymer, said catalyst (i) and said second ligand compound (ii) being dissolved in said solvent (iii).

3. The process according to claim 2 wherein said solvent (iii) is selected from the group consisting of chlorobenzene, benzene, toluene, xylene, acetone, 1,1,2-trichloroethane, and mixtures thereof and wherein the concentration of said copolymer in the solution is from about 1 to about 20 percent by weight based on the total weight of said solution.

4. The process according to claim 2 wherein said $L_1$ and said $L_2$ are the same and are selected from trimethylphosphine, triethylphosphine, triphenylphosphine and triphenylarsine.

5. The process according to claim 4 wherein said $L_1$ and said $L_2$ are triphenylphosphine.

6. The process according to claim 2 wherein the amount of said second ligand compound (ii) is from about 3 to about 20 percent by weight, the amount of said catalyst (i) is from about 0.1 to about 15 percent by weight, and the weight ratio of (ii):(i) is from about 0.6:1 to about 10:1.

7. The process according to claim 2 wherein the pressure of hydrogen is from about 0.05 to about 3 MPa and the temperature is from about 80° to about 160° C.

8. The process according to claim 1 wherein said copolymer is hydrogenated in the form of an aqueous emulsion containing from about 3 to about 40 percent by dry weight of said copolymer based on the total weight of said emulsion.

9. The process according to claim 8 wherein said solvent (iii) is selected from mixtures of toluene with acetone and of chlorobenzene with acetone and wherein the amount of (iii) is such that the dry weight of said copolymer is from about 1 to about 20 percent based on the total weight of said copolymer and said (iii).

10. The process according to claim 8 wherein said $L_1$ and said $L_2$ are the same and are selected from trimethylphosphine, triethylphosphine, triphenylphosphine and triphenylarsine.

11. The process according to claim 10 wherein said $L_1$ and said $L_2$ are triphenylphosphine.

12. The process according to claim 8 wherein the amount of said second ligand compound (ii) is from about 10 to about 20 percent by weight, the amount of said catalyst (i) is from about 1 to about 2 percent by weight, and the weight ratio of (ii):(i) is from about 5:1 to about 15:1.

13. The process according to claim 8 wherein the pressure of hydrogen is from about 1.4 to about 4 MPa and the temperature is from about 80° to about 120° C.

14. The process according to claim 2 wherein said copolymer is selected from the group consisting of butadiene-(meth)acrylonitrile copolymers, isoprene-(meth)acrylonitrile copolymers, copolymers of butadiene with (meth)acrylonitrile and one or more monomers selected from itaconic acid, fumaric acid, (meth)acrylic acid, and maleic acid, and AB, ABA and ABCBA block copolymers wherein A may be one of butadiene or isoprene, B may be one of styrene or α-methylstyrene, and C may be a coupling agent residue.

15. The process according to claim 8 wherein said copolymer is selected from the group consisting of butadiene-(meth)acrylonitrile copolymers, isoprene-(meth)acrylonitrile copolymers, copolymers of butadiene with (meth)acrylonitrile and one or more monomers selected from itaconic acid, fumaric acid, (meth)acrylic acid, and maleic acid, and AB, ABA and ABCBA block copolymers wherein A may be one of butadiene or isoprene, B may be one of styrene or α-methylstyrene, and C may be a coupling agent residue.

16. The process according to claim 1 wherein from about 50 to about 99.95 percent of said carbon-carbon double bonds are hydrogenated.

17. The process according to claim 14 wherein said copolymer is a butadiene-acrylonitrile copolymer and wherein from about 95 to about 99.95 percent of said carbon-carbon double bonds are hydrogenated.

18. The process according to claim 15 wherein said copolymer is a butadiene-acrylonitrile copolymer and wherein from about 95 to about 99.95 percent of said carbon-carbon double bonds are hydrogenated.

19. The process according to claim 14 wherein said copolymer is a block copolymer and wherein from about 95 to about 99.95 percent of said carbon-carbon double bonds are hydrogenated.

20. The process according to claim 15 wherein said copolymer is a block copolymer and wherein from about 95 to about 99.95 percent of said carbon-carbon double bonds are hydrogenated.

* * * * *